Patented Dec. 19, 1950

2,534,275

UNITED STATES PATENT OFFICE 2,534,275

METHOD OF REFINING RUTIN

Charles F. Krewson, Joseph Naghski, and William L. Porter, Philadelphia, Pa., assignors to the United States of America as represented by the Secretary of Agriculture No Drawing. Application July 18, 1947, Serial No. 762,012

7 Claims. (Cl. 260—210)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of rutin and has for an object the provision of a method for the purification of rutin.

Rutin, a flavonol glycoside possessing valuable therapeutic properties, is a widely distributed plant constituent, which can be isolated from plant material by solvent extraction. The rutin so obtained is sometimes contaminated by impurities that cannot be eliminated by prior methods utilized in the purification of crude rutin, such as extraction, treatment with absorbing agents and crystallization.

The impurities which are not segregatable from rutin, by purification processes involving physical treatments only, include iron-containing substances, the occurrence of which may be attributed to the interaction of rutin with iron-containing materials during processing or storage and organic substances of undetermined nature which probably are components or degradation products of rutin-bearing plant tissues.

The presence of these impurities has a detrimental effect on rutin, causing discoloration and decomposition of rutin preparations, especially on exposure to light, and consequently their elimination is essential to the production of rutin preparations intended for medicinal use.

The presence of these organic impurities also causes considerable losses of rutin in the course of purification treatment. When the rutin is crystallized from hot aqueous solutions, a considerable portion, sometimes as much as 10 percent of the rutin present, fails to crystallize out on cooling, and remains in solution even after extensive concentration of the mother liquor.

We have found that iron-containing impurities and non-metalliferous extraneous substances, which are not eliminated by the usual methods utilized in refining rutin, can be removed by forming a solution of rutin in an aqueous medium having a pH of less than 3, and recovering the rutin from the resulting solution.

Purification of rutin in accordance with the method of our invention can best be effected by crystallization from an aqueous solution having a pH of less than 3, and preferably within the pH range of 2.5 to 2.9. Although the process is operable at a pH of less than 2.5, hydrolysis of rutin caused by extended treatment at elevated temperature should be avoided. Water as well as other aqueous solvents such as aqueous alcohols, dioxane, or acetone can be used. The acidity of the solvent medium can be adjusted to the desired pH by addition of organic or inorganic acidic substances, such as citric, hydrochloric, sulfuric or phosphoric acid, alkali bisulfates and similar acidic salts. Recovery of rutin from the acidified solution can be attained by any suitable means comprising, for example, crystallization or precipitation by cooling or by evaporation of the solvent medium and extraction with a selective solvent.

When rutin containing organic impurities is crystallized from solutions in hot water at a pH of less than 3, substantially complete separation of purified crystalline rutin takes place on cooling, and practically no rutin remains in the mother liquor.

Removal of extraneous products from rutin preparations purified by the present method is best evidenced by spectrophotometric examination. Within the wave-length range of 400–750 millimicrons, pure rutin gives a transmission curve of a smooth type. The degree of purity of the examined specimen is indicated by the percentage of transmission which determines the position of the curve as compared to that of a curve obtained under identical conditions using pure rutin. A low percentage of transmission indicates the presence of impurities, and the removal of these extraneous products causes the curve of the refined material to approximate more closely that of pure rutin.

The presence of iron-containing impurities can also be established by chemical analysis.

The following examples illustrate the invention:

Example I

Rutin obtained from an alcoholic plant extract produced and stored in iron equipment, and showing a strong green discoloration, was recrystallized three times from hot water. The first recrystallization operation included treatment of the solution with silica gel by the procedure described by Couch, Krewson and Porter in their application for Patent Serial No. 685,632, filed July 23, 1946, now Patent No. 2,500,930. The resulting product after extraction with benzene in a Soxhlet apparatus still retained its green color. The absence of chlorophyll was demonstrated by dissolving a portion of the sample in alcohol and precipitating the dissolved rutin with benzene after which it still remained discolored. The transmission curve also showed the absence of chlorophyll, but the low transmittancy indicated the presence of some extraneous material. The presence of iron-containing impurities was established by ashing a sample of the rutin, dissolving the ash in hydrochloric acid, and adding ammonium thiocyanate to the solution. A strong red coloration, due to the formation of ferric thiocyanate, was produced.

Fourteen grams of this rutin was dissolved in 3500 cc. of boiling water and the solution acidified to pH of 2.5–2.9 by addition of 4.5 cc. 3-normal hydrochloric acid. The color of the solution changed from green to pale yellow. On standing at room temperature the rutin separated from the solution in the form of a pale yellow crystalline precipitate, which was removed by filtration, washed with cold water, and dried to constant weight at 110° C. The purified rutin thus obtained was found to be free of iron when tested by the above-described method, and on spectrophotometric examination gave an absorption curve showing high transmittance.

Example II

Rutin, of commercial origin, prepared from an alcoholic plant extract, was subjected to recrystallization operations which failed to render it sufficiently pure for pharmaceutical purposes. Spectrophotometric examination established the presence of a substantial quantity of extraneous impurities. That this material contained no metalliferous impurities, such as iron or copper complexes, was shown by analytical tests.

A 4-gram sample was dissovled in one liter of boiling water, cooled to about 70° C., and acidified to a pH of 2.6 with 8 cc. of 1-normal sulfuric acid. This solution was maintained at approximately 70° C. for one hour and filtered. The crystalline rutin which separated from the filtrate on subsequent cooling was filtered off and dried at 110° C. The rutin so obtained gave an absorption curve of high transmittancy, as shown in the following table. The experimental data tabulated below were obtained by the following procedure using a recording spectrophotometer. The material tested was dried at 110° C. An approximately 100 milligram sample of the dried product, weighed to the nearest milligram, was dissolved in about 10 milliliters of 95 percent ethanol. The solution was then centrifuged, if necessary, to remove any alcoholic insoluble materials and made up to a volume of 25 milliliters. The transmittancies of these solutions containing approximately 4 grams of rutin per liter were determined in 5 cm. cells without further dilution.

| Wave Length in Millimicrons | Percentage of Transmission [1] | | |
|---|---|---|---|
| | A | B | C |
| 440 | 1 | 1.25 | 12.5 |
| 460 | 3.5 | 10 | 54 |
| 480 | 7.5 | 24 | 76 |
| 500 | 13.75 | 38 | 84.5 |
| 520 | 20.5 | 47.5 | 88.5 |
| 540 | 27.5 | 56 | 91 |
| 560 | 35 | 64 | 92.5 |
| 580 | 42 | 69.5 | 93.5 |
| 590 | 44 | 72 | 94 |
| 620 | 56 | 78 | 95.5 |
| 655 | 63 | 84 | 96.5 |
| 690 | 76 | 88.5 | 97.5 |
| 700 | 78.5 | 89.5 | 97.7 |

[1] NOTES:
A. Rutin used in Example II, before crystallization from acid solution.
B. Rutin used in Example II after crystallization from acid solution.
C. Standard sample of pure rutin.

Similar results were also obtained by procedures analogous to that described in the foregoing example, using hydrochloric or citric acid instead of sulfuric acid, and acidifying the aqueous rutin solutions to a pH within the range of 2.5—2.9, at temperatures from 100° C. to 55° C.

Example III

The mother liquor obtained on cooling a saturated solution of crude rutin in 145 gallons of boiling water and filtering off the resulting precipitate consisting of 7.4 pounds of crystalline rutin, was evaporated to a volume of about 10 gallons. No separation of rutin occurred when this concentrated solution was cooled and allowed to stand at room temperature. The concentrate was then heated to about 80° C. and acidified to a pH of about 2.5 with sulfuric acid. The hot acidified solution was filtered within an hour to remove the insoluble impurities. On standing for 48 hours the filtrate deposited a crystalline precipitate, consisting of 2.2 oz. rutin.

Cross-reference is made to Krewson application, Serial No. 753,792, filed June 10, 1947.

Having thus described our invention, we claim:

1. A process of purifying rutin containing iron impurities comprising recrystallizing rutin from solution, dissolving the partially purified rutin in hot water, acidifying to a pH of 2.5 to 2.9, and thereafter crystallizing the rutin from the acidified solution.

2. A process of refining rutin contaminated by iron-impurities which comprises dissolving rutin in hot water, acidifying the solution to a pH in the range of 2.5 to 2.9, and cooling the solution to crystallize the rutin.

3. A process of purifying rutin contaminated by products consisting of iron-containing impurities and non-metalliferous products comprising dissolving the contaminated rutin in hot water, acidifying the solution to a pH in the range 2.5 to 2.9, the acidified solution being at a temperature no higher than about 80° C., removing any insoluble impurities formed, and cooling to crystallize the rutin.

4. A process of recovering rutin comprising dissolving crude rutin in hot water, cooling to precipitate rutin, concentrating the mother liquor, acidifying to a pH of 2.5 to 2.9, separating any insoluble material formed, and thereafter crystallizing purified rutin from the acidified solution.

5. The process as defined in claim 3 wherein the aqueous solution is acidified by addition of sulfuric acid.

6. The process as defined in claim 3 wherein the aqueous solution is acidified by addition of hydrochloric acid.

7. A process of purifying rutin comprising cooling a saturated hot solution of crude rutin in water, filtering off the rutin so precipitated from the mother liquor, concentrating the mother liquor, acidifying the concentrated mother liquor to a pH of 2.5 to 2.9, thereby causing the impurities to become insoluble, separating the insoluble material, and thereafter crystallizing rutin from the acidified solution.

CHARLES F. KREWSON.
JOSEPH NAGHSKI.
WILLIAM L. PORTER.

REFERENCES CITED

The following references are of record in the file of this patent:

UNITED STATES PATENTS

| Number | Name | Date |
|---|---|---|
| 2,450,555 | Koones | Oct. 5, 1948 |

OTHER REFERENCES

Borntrager, Annalen der Chemie, vol. 53 (1845), pages 385–389, 5 pages.